United States Patent
Reyes

(10) Patent No.: US 9,738,823 B2
(45) Date of Patent: Aug. 22, 2017

(54) TREATMENT FLUIDS COMPRISING A STABILIZING COMPOUND HAVING QUATERNIZED AMINE GROUPS AND METHODS FOR USE THEREOF

(75) Inventor: Enrique A. Reyes, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 776 days.

(21) Appl. No.: 13/588,158

(22) Filed: Aug. 17, 2012

(65) Prior Publication Data

US 2014/0048261 A1    Feb. 20, 2014

(51) Int. Cl.
C09K 8/60 (2006.01)
E21B 43/28 (2006.01)
C09K 8/575 (2006.01)
C09K 8/74 (2006.01)

(52) U.S. Cl.
CPC ........... *C09K 8/575* (2013.01); *C09K 8/74* (2013.01)

(58) Field of Classification Search
None
See application file for complete search history.

(56) References Cited

U.S. PATENT DOCUMENTS

| | | | |
|---|---|---|---|
| 4,089,878 A | 5/1978 | Bundy | |
| 4,090,563 A | 5/1978 | Lybarger et al. | |
| 4,497,596 A | 2/1985 | Borchardt et al. | |
| 4,703,803 A | 11/1987 | Blumer | |
| 5,097,904 A * | 3/1992 | Himes | 166/294 |
| 5,446,145 A | 8/1995 | Love et al. | |
| 5,529,125 A | 6/1996 | Di Lullo Arias et al. | |
| 5,783,524 A | 7/1998 | Greindl et al. | |
| 6,436,880 B1 | 8/2002 | Frenier | |
| 6,806,236 B2 | 10/2004 | Frenier et al. | |
| 7,192,908 B2 | 3/2007 | Frenier et al. | |
| 7,427,584 B2 | 9/2008 | Frenier et al. | |
| 7,589,050 B2 | 9/2009 | Frenier et al. | |
| 2004/0235677 A1* | 11/2004 | Nguyen et al. | 507/200 |
| 2005/0137095 A1 | 6/2005 | Cawiezel et al. | |
| 2005/0189113 A1 | 9/2005 | Cassidy et al. | |
| 2006/0013798 A1 | 1/2006 | Henry et al. | |
| 2006/0118302 A1 | 6/2006 | Fuller et al. | |

(Continued)

FOREIGN PATENT DOCUMENTS

| | | |
|---|---|---|
| EP | 1 817 391 | 8/2007 |
| WO | WO 00/32711 A1 | 6/2000 |

(Continued)

OTHER PUBLICATIONS

International Search Report and Written Opinion for PCT/US2013/054511 dated Nov. 13, 2013.

(Continued)

*Primary Examiner* — Jeffrey Washville
(74) *Attorney, Agent, or Firm* — McDermott Will & Emery LLP

(57) ABSTRACT

Methods for mitigating precipitation during matrix acidizing of a subterranean formation. The methods generally comprise introducing a treatment fluid into a subterranean formation. The treatment fluid comprises a chelating agent; a hydrofluoric acid source; and a stabilizing compound. The stabilizing compound has two or more quaternized amine groups. In some cases the treatment fluid further comprises alkali metal ions.

14 Claims, 11 Drawing Sheets

(56) References Cited

U.S. PATENT DOCUMENTS

| | | |
|---|---|---|
| 2006/0131022 A1 | 6/2006 | Rae et al. |
| 2007/0111896 A1 | 5/2007 | Knox et al. |
| 2009/0042748 A1* | 2/2009 | Fuller ........................... 507/203 |
| 2009/0192057 A1 | 7/2009 | Frenier et al. |
| 2010/0048429 A1 | 2/2010 | Dobson, Jr. et al. |
| 2010/0311622 A1 | 12/2010 | Knox |
| 2011/0259592 A1 | 10/2011 | Reyes |
| 2011/0290482 A1 | 12/2011 | Weerasooriya et al. |
| 2012/0067576 A1 | 3/2012 | Reyes et al. |
| 2012/0097392 A1 | 4/2012 | Reyes et al. |
| 2012/0115759 A1 | 5/2012 | Reyes |
| 2012/0145401 A1 | 6/2012 | Reyes |

FOREIGN PATENT DOCUMENTS

| | | |
|---|---|---|
| WO | WO2006054261 A2 | 5/2006 |
| WO | WO 2012/080296 A1 | 6/2012 |
| WO | WO 2012/080297 A1 | 6/2012 |
| WO | WO 2012/080298 A1 | 6/2012 |
| WO | WO 2012/080299 A1 | 6/2012 |
| WO | WO 2012/080463 A1 | 6/2012 |
| WO | 2014028375 A1 | 2/2014 |

OTHER PUBLICATIONS

BASF Publication, "Trilon® M Types," 2007.
Yokel, Robert A., "Aluminum Chelation Principles and Recent Advances," Coordination Chemistry Reviews 228 (2002) 97-113.
Shuchart, Chris E., "Chemical Study of Organic-HF Blends Leads to Improved Fluids," SPE 37281, 1997.
Dabbs et al., "Inhibition of Aluminum Oxyhydroxide Precipitation with Citric Acid," Langmuir, 2005, 21, 11690-11695.
Gdanski, Rick, "Kinetics of the Secondary Reaction of HF on Alumino-Silicates," SPE 37214, 1997.
Gama et al., "A bis(3-hydroxy-4pyridinone)-EDTA derivative as a strong chelator for M3+ hard metal ions: complexation ability and selectivity," Dalton Transactions, First published as an Advance Article on the web on Jun. 9, 2009.
Shuchart, "Identification of Aluminum Scale with the Aid of Synthetically Produced Basic Aluminum Fluoride Complexes," SPE 23812, 1992.
Biber et al., "An In-Situ ATR-FTIR Study: The Surface Coordination of Salicylic Acid on Aluminum and Iron (III) Oxides," Environ, Sci. Technol. 1994, 28, 763-768.
Neubauer et al., "Heavy Metal Sorption on Clay Minerals Affected by the Siderophore Desferrioxamine B," Environ. Sci. Technol. 2000, 34, 2749-2755.
Dickie et al., "In-Situ Infrared Spectroscopic Studies of Adsorption Processes on Boehmite particle Films: Exchange of Surface Hydroxyl Groups Observed Upon Chelation by Acetylacetone," Langmuir 2004, 20, 11630-11636.
Thomas et al., "Aluminum (III) Speciation with Acetate and Oxalate. A Potentiometric and 27 Al NMR Study," Environ. Sci. Technol. vol. 25, No. 9, 1991.
Johnson et al., "Adsorption of Organic Matter at Mineral/Water Interfaces. 2. Outer-Sphere Adsorption of Maleate and Implications for Dissolution Processes," Langmuir 2004, 20, 4996-5006.
Yip et al., "Kinetic Interactions of EDDS with Soils. 1. Metal Resorption and Competition under EDDS Deficiency," Environ. Sci. Technol. 2009, 43, 831-836.
Clay et al., "The Catalytic Effect of Anions upon the Rate of Dissolution of Hydrous Alumina by Acids," Contribution from the Department of Chemistry, Columbia University, vol. 60, 2384-2390.
Plankey, B.J. and H.H. Patterson (1989) "Mechanism of Ligand Substitution in Aluminum(III) Complexes"—Inorganic Chemistry 28(24): 4331-4333.
Lisbona, D.F. and K.M. Steel (2008) "Recovery of Fluoride Values from Spent Pot-Lining: Precipitation of an Aluminum Hydroxyfluride Hydrate Product"—Separation and Purification Technology 61: 182-192.
Gdanski, R.D. (1994) "Fluosilicate Solubilities Impact HF Acid Compositions"—SPE 27404: 607-619.
Stanley, F.L. J.C. Tronocoso, et al (2000) "Matrix Acidizing Horizontal Gravel-Packed Wells for Fines Damage Removal"—SPE 65519: 1-10.
Aboud, R.K. Smith, et al. (2007) "Effective Matrix Acidizing in High-Temperature Environments"—SPE 109818, 1-10.
Martinez, E.J., J.L. Girardet, et al. (1996) "Multinuclear NMR Study of Fluoroaluminate Complexes in Aqueous Solution"—Inorganic Chemistry 35(3): 706-710.
Bodor, A.I. Toth, et al. (2000) "19F NMR Study of the Equilibria and Dynamics of the A/3+/F-System"—Inorganic Chemistry 39(12): 2530-2537.
Yu, P., B.L. Phillips, et al. (2001) "Water Exchange in Fluoroaluminate Complexes in Aqueous Solution: A Variable Temperature Multinuclear NMR Study"—Inorganic Chemistry 40(18): 4750-4754.
Al-Anazi et al., Matrix Acidizing of Water Injectors in a Sandstone Field in Saudi Arabia: A Case Study, SPE 62825, 2000.
Mahmoud et al., "Removing Formation Damage and Stimulation of Deep Illitic-Sandstone Reservoirs Using Green Fields," SPE 147395, 2011.
Gdanski, R.D., "Kinetics of the Primary Reaction of HF on Alumino-Silicates," SPE Prod. & Facilities 15 (4), Nov. 2000, SPE 66564.
Gdanski, R.D., "Fluosilicate Solubilities Affect HF Acid Compositions," SPE Production & Facilities, Nov. 1994, SPE 27404.
Toth et al., "F NMR Study of the Equilibria and Dynamics of the AI3+/F-System," Inorg. Chem. 2000, 39, 2530-2537.
Nowack, "Envionmental Chemistry of Aminopolycarboxylate Chelating Agents," Environ. Sci. Tech. 2002, 36(19), 4009-4016.
Frenier et al., "Use of Highly Acid-Soluble Chelating Agents in Well Stimulation Services," SPE 63242, 2000.
Feng, T.L., P.L. Gurian, et al. (1990) "Aluminum Citrate: Isolation and Structural Characterization of a Stable Trinuclear Complex"—Inorganic Chemistry 29(3): 408-411.

* cited by examiner

TREATMENT FLUIDS COMPRISING A STABILIZING COMPOUND HAVING QUATERNIZED AMINE GROUPS AND METHODS FOR USE THEREOF

BACKGROUND

The present disclosure generally relates to matrix acidizing of subterranean formations, and, more specifically, to methods for mitigating precipitation that may occur in conjunction with acidizing operations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Unless otherwise specified, use of these terms does not imply any particular action by the treatment fluid or a component thereof. Illustrative treatment operations can include, without limitation, drilling operations, stimulation operations, production operations, remediation operations, sand control operations, and the like, which may include, for example, fracturing operations, gravel packing operations, acidizing operations, descaling operations, consolidation operations, and the like.

In acidizing operations, a subterranean formation containing an acid-soluble material (e.g., carbonates, silicates, or aluminosilicates) can be treated with an acid to dissolve at least a portion of the material. The acid-soluble material may exist naturally within the subterranean formation, or it may have been deliberately introduced into the subterranean formation in conjunction with performing a subterranean operation (e.g., proppant particulates or bridging agents). Dissolution of these acid-soluble materials can desirably open voids and conductive flow pathways in the formation that can improve the formation's permeability and enhance its rate of hydrocarbon production, for example. In a similar motif, acidization may sometimes be used to remove precipitation damage, occluding materials, mineral materials, perforation debris, and the like that can be present in the subterranean formation.

Carbonate formations often contain minerals that comprise a carbonate anion (e.g., calcite). When acidizing a carbonate formation, the acidity of the treatment fluid alone can be sufficient to solubilize the formation matrix components. Both mineral acids (e.g., hydrochloric acid) and organic acids (e.g., acetic acid, formic acid, methanesulfonic acid, and the like) can be used to treat a carbonate formation, often with similar degrees of success.

Siliceous formations can include silicate and/or aluminosilicate minerals such as, for example, zeolites, clays, and feldspars. As used herein, the term "siliceous" refers to substances having the characteristics of silica, including silicates and/or aluminosilicates. Most sandstone formations, for example, contain about 40% to about 98% sand quartz particles (i.e., silica), bonded together by various amounts of cementing material including carbonates (e.g., calcite), aluminosilicates, and other silicates.

Acidizing a siliceous formation (e.g., a sandstone formation or a clay-containing formation) or a formation containing a siliceous material is thought to be considerably different than acidizing a carbonate formation. Specifically, the treatment of a siliceous formation with the treatment fluids commonly used for acidizing a carbonate formation may have little to no effect, because mineral acids and organic acids do not effectively react with siliceous materials. In contrast to mineral acids and organic acids, hydrofluoric acid can react very readily with siliceous materials to produce soluble substances. Oftentimes, a mineral acid and/or an organic acid (e.g., formic acid, acetic acid, methanesulfonic acid, and the like) may be used in conjunction with a hydrofluoric acid-containing treatment fluid to maintain the treatment fluid in a low pH state as the hydrofluoric acid becomes spent. In some instances, the low pH of the treatment fluid may promote initial silicon dissolution and aid in maintaining the silicon in a dissolved state. At higher subterranean formation temperatures (e.g., above about 200° F.), it may be undesirable to lower the pH below about 1 due to mineral instability that can occur. Additionally, corrosion can be an inevitable problem that occurs when very low pH treatment fluids are used.

Although low pH treatment fluids may be desirable to aid in dissolution of siliceous materials, precipitation of insoluble fluorosilicates and aluminosilicates can still become problematic in the presence of certain metal ions. Specifically, dissolved siliceous materials can react with Group 1 metal ions (e.g., $Na^+$ and $K^+$) to produce insoluble fluorosilicates, fluoroaluminates, and aluminosilicates. The terms "Group 1 metal ions" and "alkali metal ions" are used synonymously herein. Other metal ions, including Group 2 metal ions (e.g., $Ca^{2+}$ and $Mg^{2+}$), may also be problematic in this regard.

The precipitation of insoluble fluorosilicates, fluoroaluminates, and aluminosilicates can block pore throats and undo the desirable permeability increase initially achieved by the acidizing operation. In some instances, the formation damage caused by the deposition of insoluble fluorosilicates, fluoroaluminates, and aluminosilicates can be more problematic than if the acidizing operation had not been conducted in the first place. In contrast to many metal ions, ammonium ions ($NH_4^+$) are not believed to promote the formation of insoluble fluorosilicates, fluoroaluminates, and aluminosilicates. Accordingly, treatment fluids comprising an ammonium salt are frequently used in conjunction with acidizing operations conducted in the presence of siliceous materials, as discussed further below. However, use of ammonium salts in treatment fluids can considerably increase the cost of performing a treatment operation.

Problematic alkali metal ions or other metal ions can come from any source including, for example, the treatment fluid, a component of the treatment fluid, or the subterranean formation itself. For example, the carrier fluid of a treatment fluid may contain some sodium or potassium ions unless costly measures (e.g., deionization) are taken to limit their presence. Alkali metal ions, in particular, are widely distributed in the environment and can be especially difficult to avoid completely when conducting a subterranean treatment operation. As discussed further below, a variety of strategies have been developed to address the most common sources of problematic metal ions encountered when conducting subterranean treatment operations. As a general rule, it has been conventional to minimize the effective concentration of metal ions during treatment so to avoid the foregoing issues and others.

One strategy that has been used with some success to avoid the damaging effects of metal ions may include introducing a sequence of pre-flush treatment fluids into the subterranean formation prior to performing an acidizing operation with hydrofluoric acid. For example, a pre-flush treatment fluid comprising a mineral acid or an organic acid can be used to dissolve acid-soluble formation matrix components and remove at least a portion of the problematic metal ions from the formation. Thereafter, another pre-flush treatment fluid comprising an ammonium salt can be introduced into the subterranean formation to displace the remaining formation matrix metal ions and leave the formation enriched in ammonium ions. Although this approach can be used successfully for mitigating unwanted precipitation, it can considerably add to the time and expense needed to perform an acidizing operation.

Another strategy that can be used to mitigate the effects of metal ions in acidizing operations is to introduce a chelating agent into the subterranean formation. Although this strategy can be successfully used for Group 2 metal ions, transition metal ions, and aluminum, for example, chelation is believed to be less effective for alkali metal ions. In addition, aluminum ions, for example, in the presence of a chelating agent and hydrofluoric acid may form fluoroaluminate complexes, such as $LAIF_2$ and LAIF (L=chelating agent) or higher fluoroaluminates, whose overall charge is determined by the charge of the chelating agent. However, these complexes may still precipitate in the presence of alkali metal ions. Further, many chelating agents are utilized in their salt form, which is many times their $Na^+$ or $K^+$ salt form. Thus, use of a chelating agent, although mitigating precipitation effects from certain metal ions, can actually exacerbate the precipitation effects of alkali metal ions due to the metal ions being introduced from the chelating agent. Sometimes the free acid or ammonium salt forms of chelating agents can be used to avoid this issue, at least in principle, but the free acid and/or ammonium salt forms of many chelating agents are either unknown or not commercially available at a reasonable cost. Furthermore, many common chelating agents are not biodegradable or present other toxicity concerns that can make their use in subterranean formations problematic.

SUMMARY

The present disclosure generally relates to matrix acidizing of subterranean formations, and, more specifically, to methods for mitigating precipitation that may occur in conjunction with acidizing operations.

In some embodiments, the present disclosure provides methods comprising: providing a treatment fluid that comprises: a chelating agent; a hydrofluoric acid source; and a stabilizing compound having two or more quaternized amine groups; and introducing the treatment fluid into a subterranean formation.

In some embodiments, the present disclosure provides methods comprising: providing a treatment fluid comprising: a chelating agent; alkali metal ions; a hydrofluoric acid source; and a stabilizing compound having two or more quaternized amine groups; introducing the treatment fluid into a subterranean formation; and at least partially dissolving a surface within the subterranean formation.

In some embodiments, the present disclosure provides methods comprising: introducing a chelating agent, a stabilizing compound having two or more quaternized amine groups, and a hydrofluoric acid source to a subterranean formation; and at least partially dissolving a surface within the subterranean formation.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modification, alteration, and equivalents in form and function, as will occur to one having ordinary skill in the art and the benefit of this disclosure.

DETAILED DESCRIPTION

Figure 1:
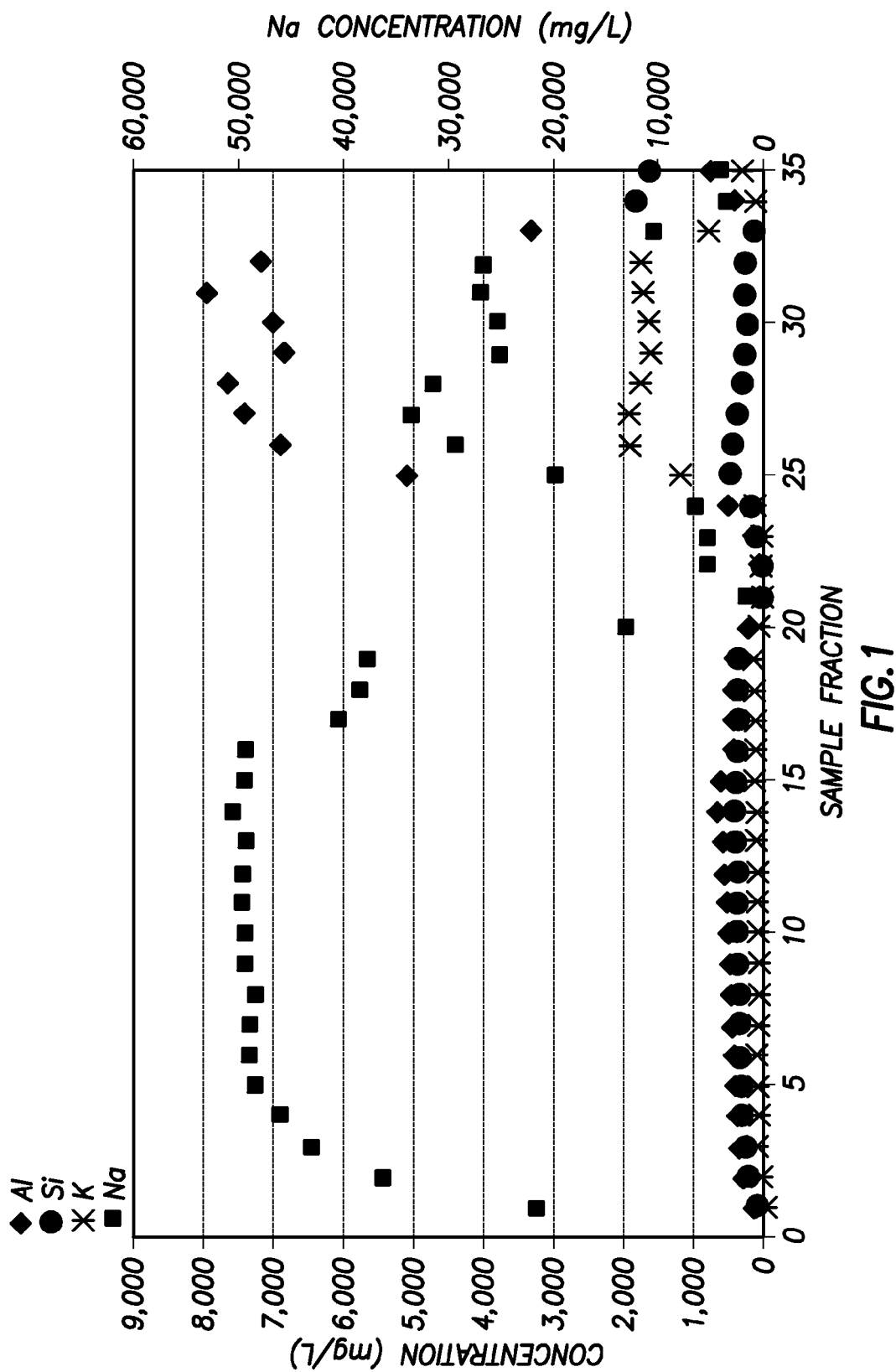
FIGS. 1 and 2 show illustrative fractional pore volume effluent analyses of a Berea sandstone core treated in two stages at 300° F. with an acidizing fluid lacking bis-quaternary ammonium compounds.

The present disclosure generally relates to matrix acidizing of subterranean formations, and, more specifically, to methods for mitigating precipitation that may occur in conjunction with acidizing operations.

As described above, metal ions, particularly alkali metal ions, can lead to a number of undesirable consequences when present during acidizing operations conducted in the presence of siliceous materials, including aluminosilicates. Current approaches for addressing alkali metal fluorosilicate, fluoroaluminate, and aluminosilicate precipitation can be costly and time consuming and may be insufficient in some cases.

The present disclosure describes the use of stabilizing compounds in conjunction with acidizing siliceous subterranean formations or subterranean formations containing a siliceous material. The stabilizing compounds may mitigate unwanted precipitation in the subterranean formation, even when alkali metal ions are present. Stabilizing compounds described herein comprise molecules that have two or more quaternized amine groups. It has been surprisingly discovered that, in the presence of such stabilizing compounds, high levels of dissolved aluminum and silicon may be obtained when acidizing siliceous materials, even in the presence of alkali metal ions. Without being bound by any theory or mechanism, it is believed that the stabilizing compounds may form an ion pair or other complex with dissolved aluminum or silicon, while the aluminum atoms are coordinated by a chelating agent and the silicon atoms are coordinated to fluoride or other ions (e.g., hydronium and/or aqua ions), which may limit the accessibility of alkali metal ions to the dissolved aluminum or silicon. In some cases the stabilizing compounds may promote the formation of particulates that are sufficiently small to be fluidly mobile and easily produced from the formation, thereby limiting damage thereto. Furthermore, the ion pair or complex may have substantially different transport characteristics than would otherwise be present in the absence of the stabilizing compounds, such that adsorption and desorption properties are altered to promote production from the formation.

A number of advantages may be realized through using a stabilizing compound in conjunction with an acidizing operation according to the embodiments described herein. A leading advantage of using a stabilizing compound in conjunction with an acidizing operation is that significantly fewer precautions may need to be taken to exclude alkali metal ions from the subterranean environment. For example, it may not be necessary to conduct pre-flush treatments with an $NH_4^+$-containing treatment fluid prior to acidizing, or fewer pre-flush treatments may be needed. This can reduce the time and expense needed to conduct the acidizing operation, while still mitigating the precipitation risk in the subterranean formation. Likewise, there may be more tolerance for alkali metal ions in the carrier fluid used to formulate the treatment fluid, thereby allowing saltier and potentially less costly water sources to be used.

Use of a stabilizing compound in conjunction with an acidizing operation, as described herein, may also significantly expand the breadth of chelating agents that may be used in conjunction with treating a subterranean formation to sequester metal ions. Specifically, use of a stabilizing compound may advantageously allow sodium or potassium salts of a chelating agent to be employed in lieu of the free acid or ammonium salt forms, which may be unknown, not commercially available, or expensive. In this regard, some of the more common chelating agents known in the art are available in their ammonium salt forms, but the chelating agents are not biodegradable. In contrast, only a limited number of biodegradable chelating agents are available in their free acid or ammonium salt forms. Thus, use of a stabilizing compound may allow a wider breadth of biodegradable chelating agents to be used in conjunction with an acidizing operation, which can improve the environmental profile of the acidizing operation and potentially further lower costs. A further discussion of biodegradable chelating agents follows hereinbelow.

A further advantage of using a stabilizing compound in conjunction with an acidizing fluid is that the fluid's pH does not need to be excessively low in order to maintain aluminum in a more stable fluid state, particularly a dissolved state. For example, in the presence of a stabilizing compound and a chelating agent, aluminum may be effectively maintained within an acidizing fluid having a pH of greater than about 2. Under such pH conditions, gelatinous aluminum precipitates that are highly damaging to subterranean formations may form in the absence of these agents. The ability to use relatively high pH acidizing fluids when practicing the present embodiments may advantageously reduce the incidence of corrosion downhole.

Although the stabilizing compounds described herein may be particularly advantageous when used in conjunction with an acidizing operation, it is to be recognized that they may be used at any point while working downhole. For example, in some embodiments, the stabilizing compounds may be used in conjunction with a stimulation operation (e.g., a fracturing operation), with a further stimulation operation being conducted at a later time (e.g., an acidizing operation using a treatment fluid comprising hydrofluoric acid and/or a hydrofluoric acid-generating compound). Such a treatment sequence may leave the subterranean formation desirably conditioned with the stabilizing compound, such that damaging effects of fluorosilicate, fluoroaluminate, and aluminosilicate precipitation is less problematic once acidizing begins. In some embodiments, the stabilizing compounds may be included in a pre-flush treatment fluid that is introduced to a subterranean formation before a treatment fluid comprising hydrofluoric acid or a hydrofluoric acid-generating compound is introduced. In some or other embodiments, the stabilizing compounds may be used in a combined treatment fluid that also comprises hydrofluoric acid or a hydrofluoric acid-generating compound, so as to achieve single-stage treatment of a subterranean formation.

In still other embodiments, the treatment fluids described herein may be used in conjunction with performing a cleanup operation.

In some embodiments, methods described herein may comprise: introducing a chelating agent, a stabilizing compound having two or more quaternized amine groups, and a hydrofluoric acid source to a subterranean formation; and at least partially dissolving a surface within the subterranean formation. In some embodiments, the subterranean formation may comprise an aluminosilicate material.

In some embodiments, the chelating agent, the stabilizing compound, and the hydrofluoric acid source may be combined in a treatment fluid that is introduced into the subterranean formation. In some embodiments, the treatment fluid may be formulated before being introduced to the subterranean formation, and in other embodiments, the treatment fluid may be formulated while being introduced to the subterranean formation (e.g., on-the-fly). In still other embodiments, the chelating agent, the stabilizing compound, and the hydrofluoric acid may be introduced into the subterranean formation separately, such that they are combined downhole.

In some embodiments, the stabilizing compound may be introduced to the subterranean formation before the chelating agent, the hydrofluoric acid source, or both. For example, as discussed above, the stabilizing compound may be included in a pre-flush treatment fluid that is introduced to the subterranean formation before acidizing takes place. In some embodiments, the chelating agent may be introduced to the subterranean formation with the stabilizing compound. In other embodiments, the chelating agent may be introduced to the subterranean formation after the stabilizing compound.

In some embodiments, methods described herein may comprise: providing a treatment fluid that comprises: a chelating agent; a hydrofluoric acid source; and a stabilizing compound having two or more quaternized amine groups; and introducing the treatment fluid into a subterranean formation. In some embodiments, the methods may further comprise at least partially dissolving a surface within the subterranean formation. In some embodiments, the treatment fluid or the subterranean formation may contain alkali metal ions.

In some embodiments, methods described herein may comprise: providing a treatment fluid that comprises: a chelating agent; alkali metal ions; a hydrofluoric acid source; and a stabilizing compound having two or more quaternized amine groups; introducing the treatment fluid into a subterranean formation; and at least partially dissolving a surface within the subterranean formation. In some embodiments, the surface being dissolved may comprise the subterranean formation. In some or other embodiments, the surface being dissolved may comprise a particulate pack present within the subterranean formation.

In some embodiments, methods described herein may comprise: providing a treatment fluid that comprises: a chelating agent; alkali metal ions; a hydrofluoric acid source; and a stabilizing compound having at least two quaternized amine groups; introducing the treatment fluid into a subterranean formation containing an aluminosilicate material; and at least partially dissolving the aluminosilicate material.

In some embodiments, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. In some embodiments, the treatment fluids described herein may comprise an aqueous carrier fluid that is substantially free of alkali metal ions or contains as low a concentration of alkali metal ions as attainable at a reasonable cost. In some embodiments, the carrier fluid may comprise an ammonium salt such as ammonium chloride, for example. Choice of a low salt, salt-substituted, or salt-free aqueous carrier fluid may allow a lower concentration of the stabilizing compound to be used in the treatment fluid, allow saltier subterranean formations to be treated, and/or permit greater quantities of alkali metal salts of chelating agents to be used. In other embodiments described herein, the treatment fluid may comprise a carrier fluid that contains alkali metal ions (i.e., contains an alkali metal salt). As described herein, use of a stabilizing compound in a treatment fluid may allow greater levity to be realized in choosing an aqueous carrier fluid for the treatment fluid than would otherwise be possible. Given the benefit of this disclosure, one of ordinary skill in the art will be able to determine an acceptable working level of alkali metal ions that may be present in the treatment fluid.

In some or other embodiments described herein, the treatment fluid may comprise an organic solvent, such as hydrocarbons, for example, as at least a portion of its continuous phase.

The volume of the carrier fluid to be used in the treatment fluids described herein may be dictated by certain characteristics of the subterranean formation being treated such as, for example, the quantity of siliceous material present therein, the desired amount of dissolution of the siliceous material, the chemistry of the siliceous material, the formation temperature, and the formation porosity. Determination of an appropriate volume of carrier fluid to be used in the present treatment fluids and amounts of the treatment fluids to be used in various subterranean operations may also be influenced by other factors, as will be understood by one having ordinary skill in the art.

In various embodiments, the treatment fluids described herein may have a pH of about 8 or below. At these pH values, siliceous materials in a subterranean formation, including aluminosilicates, may be effectively dissolved by the treatment fluid. In addition, it is to be recognized that some chelating agents may be more effective in forming metal complexes at certain pH values as opposed to others. In some embodiments, the treatment fluids may have a pH ranging between about 0 and about 8. In other embodiments, the treatment fluids described herein may have a pH ranging between about 0 and about 6, or between about 0 and about 4, or between about 0 and about 2, or between about 1 and about 6, or between about 1 and about 4, or between about 2 and about 6, or between about 0 and about 3, or between about 3 and about 6. Given the benefit of this disclosure, one of ordinary skill in the art will be able to determine an effective working pH for a given treatment fluid to satisfactorily mitigate damaging precipitation effects of alkali metal aluminosilicates, fluoroaluminates, and fluorosilicates in a particular subterranean formation.

In various embodiments, the stabilizing compound used in conjunction with the treatments described herein may contain two or more quaternized amine groups. In some embodiments, the stabilizing compound may contain 2 quaternized amine groups (e.g., a bis-quaternary ammonium compound). In some embodiments, the stabilizing compound may contain 3 quaternized amine groups, or 4 quaternized amine groups, or 5 quaternized amine groups, or 6 quaternized amine groups, or 7 quaternized amine groups, or 8 quaternized amine groups, or 9 quaternized amine groups, or 10 quaternized amine groups. In some embodiments, the stabilizing compound may comprise a polymeric compound comprising a plurality of quaternized amine groups.

In some embodiments, the stabilizing compound may comprise a bis-quaternary ammonium compound. In some embodiments, the bis-quaternary ammonium compound may have a structure of

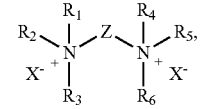

in which $R_1$-$R_6$ each comprise a carbon-containing group comprising 1 to about 20 carbon atoms, or 1 to about 10 carbon atoms, or 1 to about 6 carbon atoms; Z comprises a linker moiety comprising two or more atoms; and X is an anion. $R_1$-$R_6$ may be the same or different. In some embodiments, $R_1$-$R_6$ may be selected from the group consisting of alkyl, aryl, and cycloalkyl, any of which may optionally be unsaturated and/or contain heteroatom substitution, if desired. Heteroatoms that may be present include, for example, O and N. In some embodiments, Z may comprise a carbon chain or a heteroatom-containing carbon chain, where the heteroatom may again be O or N, for example. In some embodiments, Z may comprise a linker moiety such as, for example, —CH($R_7$)CH$_2$—, —CH(O$R_7$)CH$_2$—, —CH(N$R_7$$R_8$)CH$_2$—, —CH($R_7$)CH$_2$CH$_2$—, —CH$_2$CH($R_7$)CH$_2$—, —CH(O$R_7$)CH$_2$CH$_2$—, —CH(N$R_7$$R_8$)CH$_2$CH$_2$—, —CH$_2$CH(O$R_7$)CH$_2$—, or —CH$_2$CH(N$R_7$$R_8$)CH$_2$—, where $R_7$ and $R_8$ are independently selected from H or a carbon-containing group comprising 1 to about 20 carbon atoms, or 1 to about 10 carbon atoms, or 1 to about 6 carbon atoms. In some embodiments, $R_7$ and $R_8$ may be selected from the group consisting of alkyl, aryl, and cycloalkyl, any of which may optionally be unsaturated and/or contain heteroatom substitution. Suitable anions $X^-$ that may balance charge in the bis-quaternary ammonium compounds may include, for example, fluoride, chloride, bromide, iodide; organic anions such as formate, acetate, toluenesulfonate, and methanesulfonate; sulfate, and nitrate.

Illustrative bis-quaternary ammonium compounds that may be used in the embodiments described herein are further set forth in United States Patent Application Publications 2004/0235677, 2006/0013798, and 2010/0311622, each of which is incorporated herein by reference in its entirety. One example of a bis-quaternary ammonium compound formulation that can be suitable for use in the embodiments described herein is product BQA-6170, produced by Corsitech (Houston, Tex.), which is a mixture of bis-quaternary ammonium compounds that is commercially available through Halliburton Energy Services, Inc. (Houston, Tex.).

In various embodiments described herein, the stabilizing compound may comprise at least about 1 wt. % of a treatment fluid used in conjunction with treating a subterranean formation. In some or other embodiments, the stabilizing compound may comprise at least about 5 wt. % of the treatment fluid, or at least about 10 wt. % of the treatment fluid, or at least about 20 wt. % of the treatment fluid, or at least about 40 wt. % of the treatment fluid. In some embodiments, the stabilizing compound may comprise between about 1 wt. % and about 40 wt. % of the treatment fluid. In some or other embodiments, the stabilizing compound may comprise between about 1 wt. % and about 20 wt. % of the treatment fluid, or between about 2 wt. % and about 15 wt. % of the treatment fluid, or between about 5 wt. % and about 10 wt. % of the treatment fluid.

Chelating agents suitable for use in the embodiments described herein are not believed to be particularly limited. In some embodiments, the chelating agent may comprise the neutral form of the chelating agent. In other embodiments, the chelating agent may comprise a salt form of the chelating agent, including an alkali metal salt of the chelating agent. Other salt forms of the chelating agent may be used and include, for example, an ammonium salt form or a quaternary ammonium salt form, if available. In some embodiments, the chelating agent may comprise between about 0.1 wt. % and about 50 wt. % of the treatment fluid. In some or other embodiments, the chelating agent may comprise between about 0.5 wt. % and about 25 wt. % of the treatment fluid, or between about 1 wt. % and about 15 wt. % of the treatment fluid, or between about 5 wt. % and about 15 wt. % of the treatment fluid, or between about 5 wt. % and about 25 wt. % of the treatment fluid, or between about 5 wt. % and about 30 wt. % of the treatment fluid. Given the benefit of the present disclosure, one of ordinary skill in the art will be able to choose an appropriate chelating agent and amount thereof to include in a treatment fluid intended for a particular subterranean operation.

In some embodiments described herein, the chelating agent may be biodegradable. Although use of a biodegradable chelating agent may be particularly advantageous in some embodiments of the present disclosure, there is no requirement to do so, and, in general, any suitable chelating agent may be used. As used herein, the term "biodegradable" refers to a substance that can be broken down by exposure to environmental conditions including native or non-native microorganisms, sunlight, air, heat, and the like. Use of the term "biodegradable" does not imply a particular degree of biodegradability, mechanism of biodegradability, or a specified biodegradation half-life.

In some embodiments described herein, suitable chelating agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, any combination thereof, and the like. It is to be noted that NTA may be considered to be a biodegradable compound, but it may have undesirable toxicity issues.

In some embodiments described herein, suitable chelating agents may include biodegradable chelating agents such as, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, any combination thereof, or the like.

As alluded to above, the effectiveness of the chelating agent for coordinating metal ions may be influenced by the pH environment in which they are used. Specifically, the acid dissociation constants of the chelating agent can dictate the pH range over which the treatment fluids can be most effectively used. GLDA, for instance, has a $pK_a$ value of about 2.6 for its most acidic carboxylic acid functionality. Below a pH value of about 2.6, dissolution of metal ions will be promoted primarily by the acidity of a treatment fluid containing GLDA, rather than by chelation, since the chelating agent will be in a fully protonated state. MGDA, in contrast, has a $pK_a$ value in the range of about 1.5 to 1.6 for its most acidic carboxylic acid group, and it will not become fully protonated until the pH is lowered below about 1.5 to 1.6. In this respect, MGDA can be particularly beneficial for use in more acidic treatment fluids, since it can extend the acidity range by nearly a full pH unit over which the chelating agent is an active chelant. The lower pH of the treatment fluid can beneficially allow for a more vigorous acidizing operation to take place, if desired.

In various embodiments, the treatment fluids described herein may comprise a hydrofluoric acid source. As discussed above, use of a hydrofluoric acid source may be advantageous when treating a siliceous subterranean formation or a subterranean formation containing a siliceous material. In some embodiments, the hydrofluoric acid source may comprise hydrofluoric acid itself. In some or other embodiments, the hydrofluoric acid source may comprise a hydrofluoric acid-generating compound. Suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, fluorophosphoric acid, hexafluorotitanic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

The hydrofluoric acid source may be present in an amount such that hydrofluoric acid is present at a concentration ranging between about 0.1 wt. % and about 20 wt. % of the treatment fluid, or between about 0.15 wt. % and about 15 wt. % of the treatment fluid, or between about 0.2 wt. % and about 10 wt. % of the treatment fluid, or between about 0.25 wt. % and about 8 wt. % of the treatment fluid. Given the benefit of the present disclosure, one of ordinary skill in the art will be able to choose an appropriate hydrofluoric acid source and amount thereof to include in a treatment fluid intended for a particular subterranean operation.

In some embodiments described herein, another acid, acid-generating compound, or any combination thereof can be present in the treatment fluid in combination with the hydrofluoric acid source. The additional acid can be a mineral acid such as, for example, hydrochloric acid, or an organic acid such as, for example, acetic acid or formic acid. Other acids that also may be suitable for use include, for example, chloroacetic acid, dichloroacetic acid, trichloroacetic acid, glycolic acid, lactic acid, and methanesulfonic acid. Examples of suitable acid-generating compounds can include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol. Among other things, the additional acid or acid-generating compound can maintain the pH of a treatment fluid at a desired low level as the hydrofluoric acid source becomes spent, thereby maintaining the acid strength. Further, as discussed above, control of the pH using an additional acid or acid-generating compound may allow the chelating agent to be used in a pH region where it is more active for chelation to take place.

In some embodiments, the stabilizing compounds described herein may be used in combination with a silica scale control additive. As used herein, the term "silica scale control additive" refers to any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Use of a stabilizing compound in combination with a silica scale control additive may beneficially provide a greater degree of silicon solubilization than is possible using a silica scale control additive alone. In some embodiments, suitable silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, or any combination thereof. In some or other embodiments, the stabilizing compounds described herein may be used in combination with an ortho-dihydroxybenzene compound or a substituted pyridine compound, each of which may reduce the incidence of precipitation during an acidizing operation. Use of ortho-dihydroxybenzene compounds to reduce precipitation during acidizing operations is described in commonly owned U.S. patent application Ser. No. 12/967,868 (now published as United States Patent Application Publication 20120145401), filed on Dec. 14, 2010 and incorporated herein by reference in its entirety. Use of substituted pyridine compounds to reduce precipitation during acidizing operations is described in commonly owned U.S. patent application Ser. No. 13/444,883, filed on Apr. 12, 2012 and incorporated herein by reference in its entirety.

In some embodiments, the stabilizing compounds described herein may be used in combination with compounds that can sequester alkali metal ions. In some embodiments, suitable compounds that can sequester alkali metal ions include, for example, crown ethers, aza-crown ethers, pseudocrown ethers, or any combination thereof. Use of these types of compounds for sequestration of alkali metal ions in the course of treating a subterranean formation, particularly during acidizing operations, is described in commonly owned U.S. patent application Ser. No. 13/444,897, filed on Apr. 12, 2012 and incorporated herein by reference in its entirety. Use of a stabilizing compound in combination with a compound that sequesters alkali metal ions may be particularly advantageous for mitigating precipitation in a subterranean formation, since the detrimental effects of alkali metals may be addressed in two different ways.

In additional embodiments, the treatment fluids described herein may optionally further comprise any number of additives that are commonly used in the oilfield industry including, for example, surfactants, gel stabilizers, antioxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well.

In various embodiments, the stabilizing compounds and treatment fluids derived therefrom may be used in treating a subterranean formation. In some embodiments, the subterranean formation being treated may comprise a siliceous formation. In some embodiments, the subterranean formation may comprise a sandstone formation. In some or other embodiments, the subterranean formation may contain a siliceous material, such as proppant particulates or sand, for example. The siliceous material may occur naturally within the subterranean formation or be introduced thereto in the course of performing various subterranean operations. In more particular embodiments, the subterranean formation may comprise an aluminosilicate material. Aluminosilicate materials that may be present in a subterranean formation include clays (including mixed layer and swelling clays), zeolites, kaolinite, illite, chlorite, and feldspars for example. It is to be recognized that in some embodiments, a siliceous formation may comprise other materials that are non-siliceous in nature. For example, in some embodiments, a siliceous formation may comprise about 1% to about 35% of a carbonate material.

In some embodiments, the subterranean formation may contain alkali metal ions while being treated with the stabilizing compound. For example, in some embodiments, the subterranean formation may contain alkali metal ions that are not removed from the subterranean formation prior to introducing a treatment fluid containing the stabilizing compound thereto. Although a stabilizing compound may help mitigate damaging precipitation that occurs due to the presence of alkali metal ions, in some embodiments, it may be desirable to remove of the alkali metals that may be present in the subterranean formation. For example, in some embodiments, alkali metal ions may be at least partially removed from the subterranean formation by conducting a pre-flush with a treatment fluid containing an $NH_4^+$ salt. In some embodiments, the subterranean formation may be substantially free of alkali metal ions or be made substantially free of alkali metals ions prior to being treated. Lowering levels of alkali metal ions in the subterranean formation may allow more tolerance for alkali metal ions in the carrier fluid of the treatment fluid used for treating the subterranean formation.

In some embodiments, the treatment fluids described herein may be used in treating a particulate pack in a subterranean formation. Particulate packs may include, for example, proppant packs and gravel packs. Treatment of a particulate pack with a treatment fluid comprising a stabilizing compound may beneficially allow the permeability of the pack to be increased, such that it presents a lower impediment to fluid flow.

In some or other embodiments, the treatment fluids described herein may be used in remediation operations within a subterranean formation. Specifically, in some embodiments, treatment fluids comprising a stabilizing compound may be used to remove precipitation or accumulation damage within a subterranean formation. As used herein, the term "precipitation or accumulation damage" refers to a siliceous material that has been dissolved in a subterranean formation and deposited elsewhere within the subterranean formation.

In some embodiments, native minerals such as, for example, authigenic or detrital minerals, particularly layered aluminosilicates, feldespathic minerals, or purely siliceous minerals, may be remediated with the treatment fluids described herein. As with the treatment operations described above, removal of these materials may promote fluid flow within the subterranean formation and improve production.

To facilitate a better understanding of the present invention, the following examples of preferred embodiments are given. In no way should the following examples be read to limit, or to define, the scope of the invention.

EXAMPLES

A Hassler sleeve was used in all tests and packed with either a synthetic core mixture or a native core having known mineralogy. After loading, the sleeve was heated to the indicated temperature and testing carried out as follows. A perpendicular stress (overburden or confining) was applied in the direction of flow and maintained at a pressure of 1800 or 2000 psi with a pump. A back pressure of 500 or 1000 psi was applied counterflow. Concentration analyses were carried out using inductively coupled plasma (ICP). Effluent from the sleeve was analyzed directly without further modification, particularly without acidification.

Example 1

A Hassler sleeve was loaded with a synthetic pack of a kaolinite/quartz mixture, heated to 180° F., and confined at 2000 psi. The synthetic pack was treated with approximately 4 pore volumes of a 2% KCl pre-flush solution (1 pore volume (PV)=100 mL), followed by approximately 3 PV of an acidizing fluid containing 20 wt. % TRILON M (trisodium salt of methylglycine diacetic acid, available from BASF), 1 wt. % ammonium bifluoride, and a mixture of bis-quaternary ammonium compounds available through Halliburton Energy Services, Inc. The pH of the acidizing fluid was adjusted to 3.5, as necessary, with HCl. Thereafter, a 10 PV post-flush was conducted, first with 2 PV of 2% KCl and then an ammonium chloride solution (pH=8). During treatment with the acidizing fluid, the flow rate was set at 2.5 mL/min, and samples were collected fractionally during this time. Selected fractions were analyzed for aluminum and silicon by inductively coupled plasma (ICP), but not all fractions were analyzed. Analytical results are summarized in Table 1 below, where fractions 2-11 were obtained during the pre-flush.

TABLE 1

| Fraction Number | Al (ppm) | Si (ppm) | pH |
|---|---|---|---|
| 2 | 57.9 | 173 | 2.9 |
| 5 | 43.4 | 161 | |
| 6 | 266 | 199 | |
| 7 | 197 | 212 | |
| 8 | 160 | 203 | |
| 9 | 58.9 | 56.2 | 2.9 |
| 10 | 1.31 | 56.9 | |
| 11 | 0.38 | 62.9 | 3.97 |
| 14 | 713 | 96.7 | |
| 15 | 1340 | 157 | |
| 16 | 1830 | 336 | 2.47 |
| 19 | 2140 | 281 | |
| 20 | 913 | 250 | 2.8 |

During the pre-flush, minimal aluminum and silicon were dissolved from the synthetic pack, as expected. Once the acidizing fluid contacted the synthetic pack, high levels of dissolved aluminum were observed. The high levels of dissolved aluminum are indicative that formation of insoluble fluoroaluminates did not appear to be problematic, even in the presence of potassium ions. At the pH employed during dissolution, silicon levels remained fairly low, due to the relatively low solubility of silicon at pH values above about 2.

Example 2

A Berea sandstone core (6" long×2" diameter" was placed inside a Viton rubber sleeve and was treated in two stages. During the course of the treatment, the core temperature was held at 190° F., with a confining pressure of 2000 psi and a back pressure of 800 psi. Selected fractions were analyzed for aluminum and silicon by inductively coupled plasma (ICP), but not all fractions were analyzed. Analytical results are summarized in Table 2, where fractions above the dashed line were obtained during the first stage and fractions below the dashed line were obtained during the second stage. The core was first flushed with 5% $NH_4Cl$. In the first stage, an acidizing fluid having a pH of 5.5 and containing ammonium ethylenediamine tetraacetic acid (EDTA) and ammonium fluoride was flowed through the core for an equivalent of 2 PV, followed by a post-flush of nearly 8 PV. In the second stage, a fluid containing TRILON M, ammonium fluoride, and a mixture of bis-quaternary ammonium compounds available through Halliburton Energy Services, Inc. was flowed through the core. During the first stage, only a small amount of dissolved aluminum eluted from the core. However, during the second stage, in which the bis-quaternary ammonium compounds were present, large quantities of dissolved aluminum and silicon eluted from the core, even in the presence of high concentrations of sodium. Fractions 2 and 6 were obtained during the pre-flush.

TABLE 2

| Fraction Number | Al (ppm) | Si (ppm) | Fe (ppm) | Mg (ppm) | Na (ppm) |
| --- | --- | --- | --- | --- | --- |
| 2 | 1.47 | 900 | 7.23 | 0.04 | 818 |
| 6 | 4.73 | 878 | 3130 | 2.85 | 5.98 |
| 11 | 1510 | 1300 | 9510 | 537 | 7290 |
| 17 | 1150 | 1100 | 6340 | 624 | 6910 |
| 20 | 1710 | 1060 | 5680 | 507 | 7360 |
| 28 | 510 | 1420 | 565 | 42.4 | 3370 |

Example 3

A Berea sandstone core was acidized in two stages at 300° F., with a pre-flush and post-flush being conducted before and after each stage. In the first stage, 10 PV (1 PV=110 mL) of an acidizing fluid having a pH of 2.5 and containing 0.6 M TRILON M but no hydrogen fluoride source or bis-quaternary ammonium compounds was flowed through the core at a flow rate of 5 mL/min. Thereafter, a post-flush of 3% $NH_4Cl$ was flowed through the core. In the second stage, 3 PV of an acidizing fluid having a pH of 2 and containing 0.6 M TRILON M and 2.2 wt. % HF but no bis-quaternary ammonium compounds was flowed through the core at a flow rate of 2 mL/min.

Figure 2:
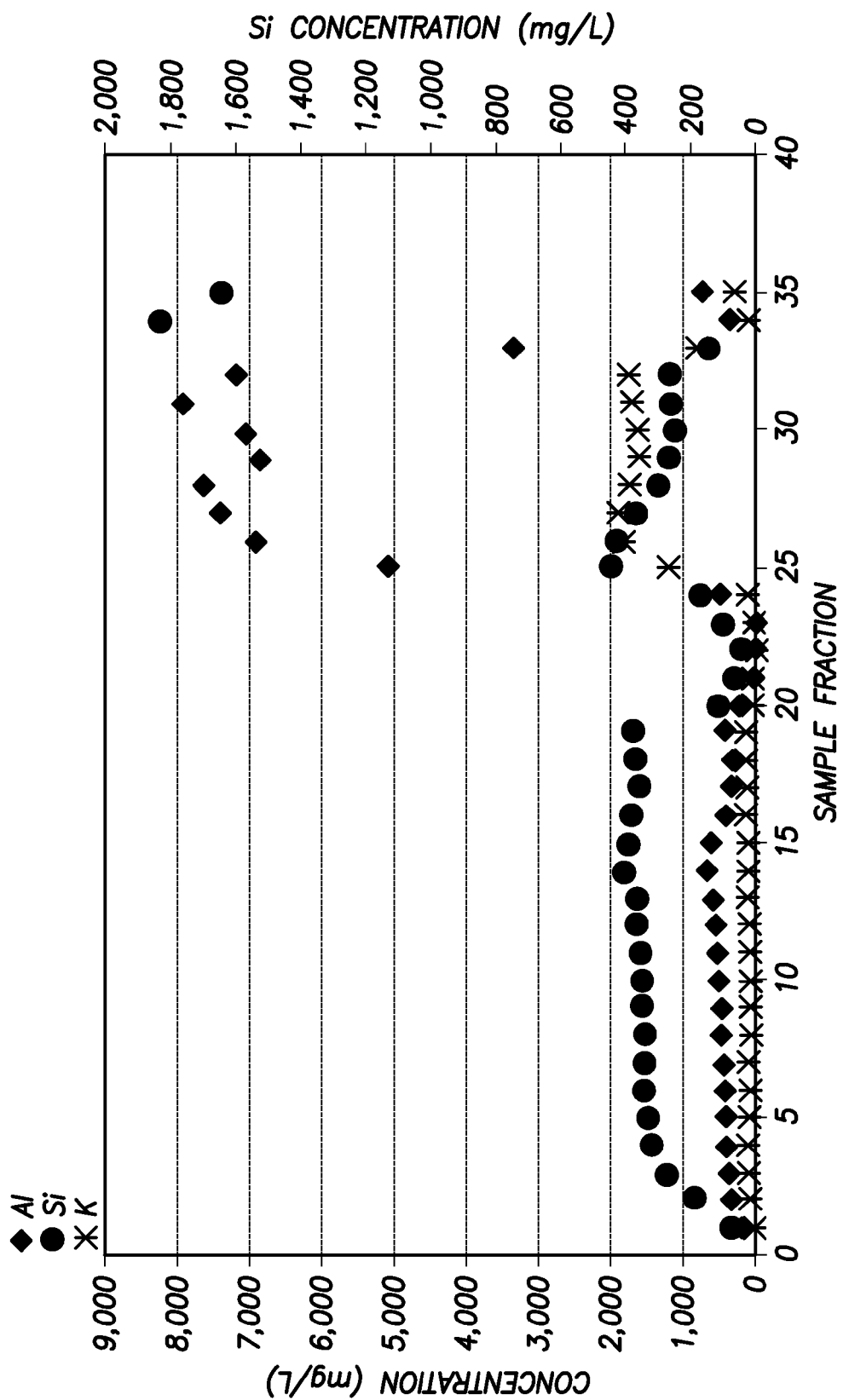

FIGS. 1 and 2 show illustrative fractional pore volume effluent analyses of a Berea sandstone core treated in two stages at 300° F. with an acidizing fluid lacking bis-quaternary ammonium compounds. FIG. 2 is an expansion of the data of FIG. 1. As shown in FIGS. 1 and 2, the first acidization stage did not result in significant solubilization of the aluminosilicates present in the core sample. However, in the second stage, significant solubilization of aluminosilicates and $K^+$ (likely from feldspar, illite, or muscovite) took place. Only during the overflush conducted at the latter stages of the experiment, did the silicon concentration appreciably exceed 400 mg/L, at which point it approached 2000 mg/L. At 25-30 PV effluent, the trend of both silicon and sodium was downward, which may be indicative of precipitation. Indeed, effluent from the second stage of acidization formed a precipitate that settled over the course of several hours. In contrast, during the first stage of acidization, when no hydrogen fluoride was present, the sodium concentration remained fairly constant.

Example 4

A synthetic core mixture of 20% kaolinite and 80% quartz was acidized in two stages at 300° F., with a pre-flush and post-flush being conducted before and after each stage. In the first stage, 2 PV of an acidizing fluid having a pH of 2.5 and containing 0.6 M TRILON M but no hydrogen fluoride source or bis-quaternary ammonium compounds was flowed through the core at a flow rate of 2.5 mL/min. Thereafter, a post-flush of aqueous $NH_4Cl$ was flowed through the core. In the second stage, 4.5 PV of an acidizing fluid having a pH of 2.5 and containing 0.6 M TRILON M and 1.7 wt. % HF but no bis-quaternary ammonium compounds was flowed through the core at a flow rate of 5 mL/min.

Figure 3:
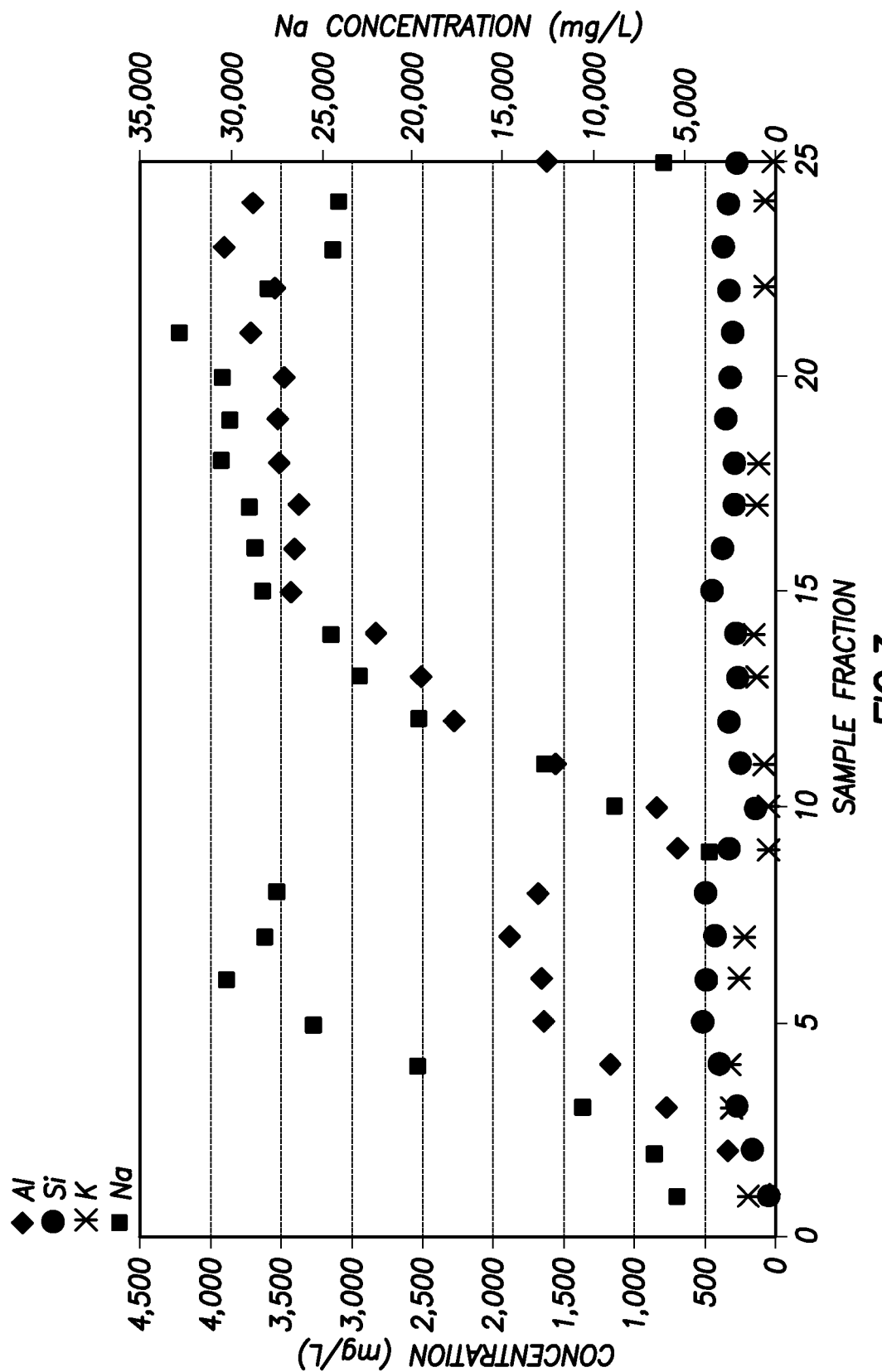
FIG. 3 shows an illustrative fractional pore volume effluent analysis of a synthetic core of kaolinite/quartz treated in two stages at 300° F. with an acidizing fluid lacking bis-quaternary ammonium compounds.

FIG. 3 shows an illustrative fractional pore volume effluent analysis of a synthetic core of kaolinite/quartz treated in two stages at 300° F. with an acidizing fluid lacking bis-quaternary ammonium compounds. As shown in FIG. 3, the amount of dissolved silicon did not appreciably exceed 500 mg/L. In the first stage, the aluminum concentration varied between approximately 1500-1600 mg/L, and in the second stage, the aluminum concentration rose to approximately 3500 mg/L. The pH of the effluent was less than 2, compared to the initial pH of approximately 2.5.

Example 5

For Example 5, a native core sample having the composition of 89% quartz, 3% sodium feldspar, 4% dolomite, 3% kaolinite, and 1% illite, as determined by X-ray powder diffraction, was used for flow testing. The core sample was treated at 250° F. with an acidizing fluid having a pH of 3.8 and containing 0.6 M TRILON M, 12 wt. % bis-quaternary ammonium compounds, and 2.8 wt. % ammonium bifluoride (corresponding to 1.96 wt. % HF). The pore volume of the core was 26 mL. The core sample was treated with a series of forward and reverse fluid flushes, where reverse refers to the production direction and forward refers to the injection direction. The treatment sequence was as follows: 7.5 PV 7% KCl (reverse, 5 mL/min), 5 PV 5% $NH_4Cl$ (reverse, 5 mL/min), 10 PV acidizing fluid (forward, 3 mL/min), 5 PV 5% $NH_4Cl$ (reverse, 5 mL/min), and 5 PV 7% KCl (reverse, 5 mL/min). The pH of the effluent ranged from 1-2 during the test.

Figure 4:
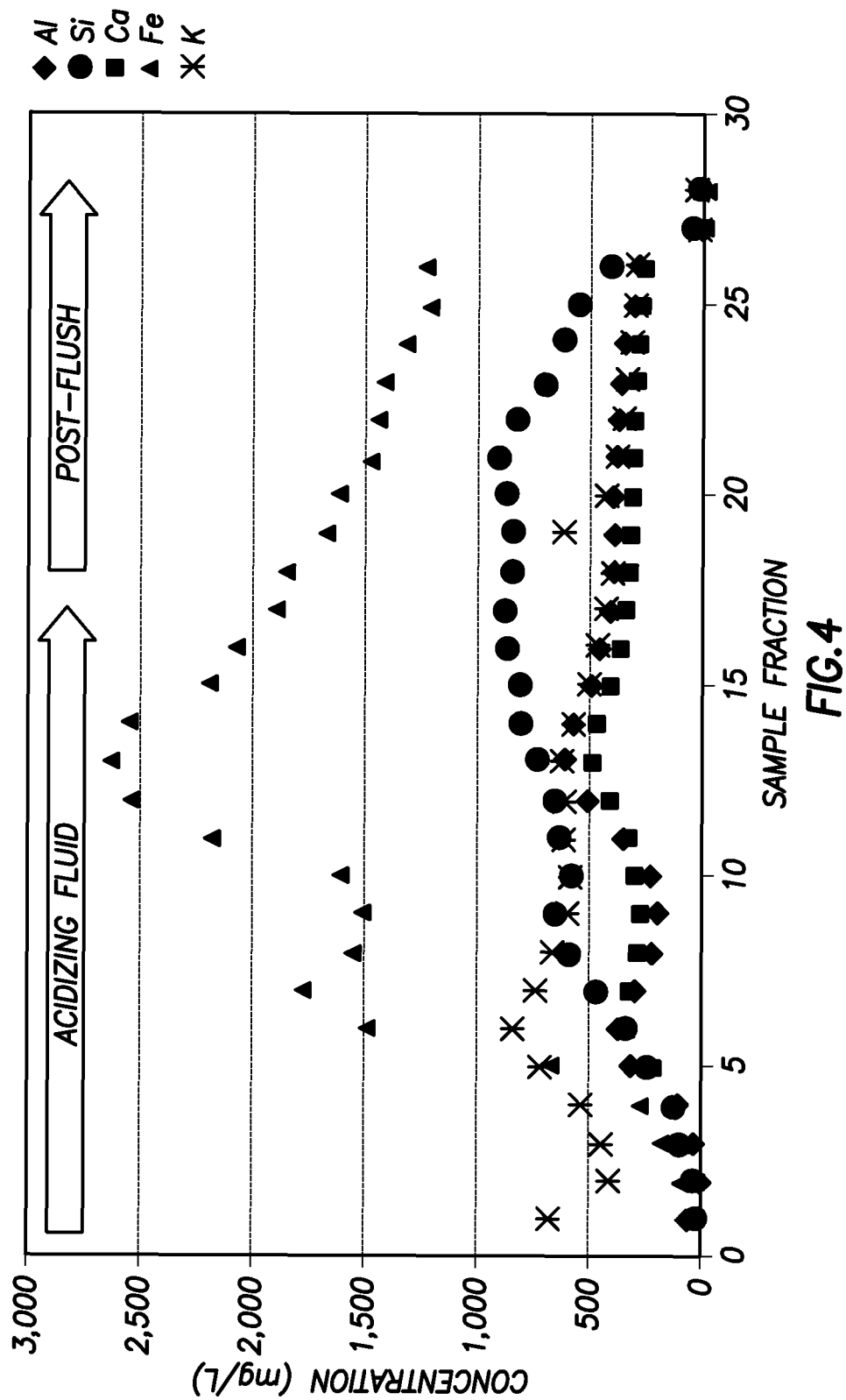
FIG. 4 shows an illustrative fractional pore volume effluent analysis of a native core sample treated at 250° F. with an acidizing fluid containing bis-quaternary ammonium compounds.
Figure 5:
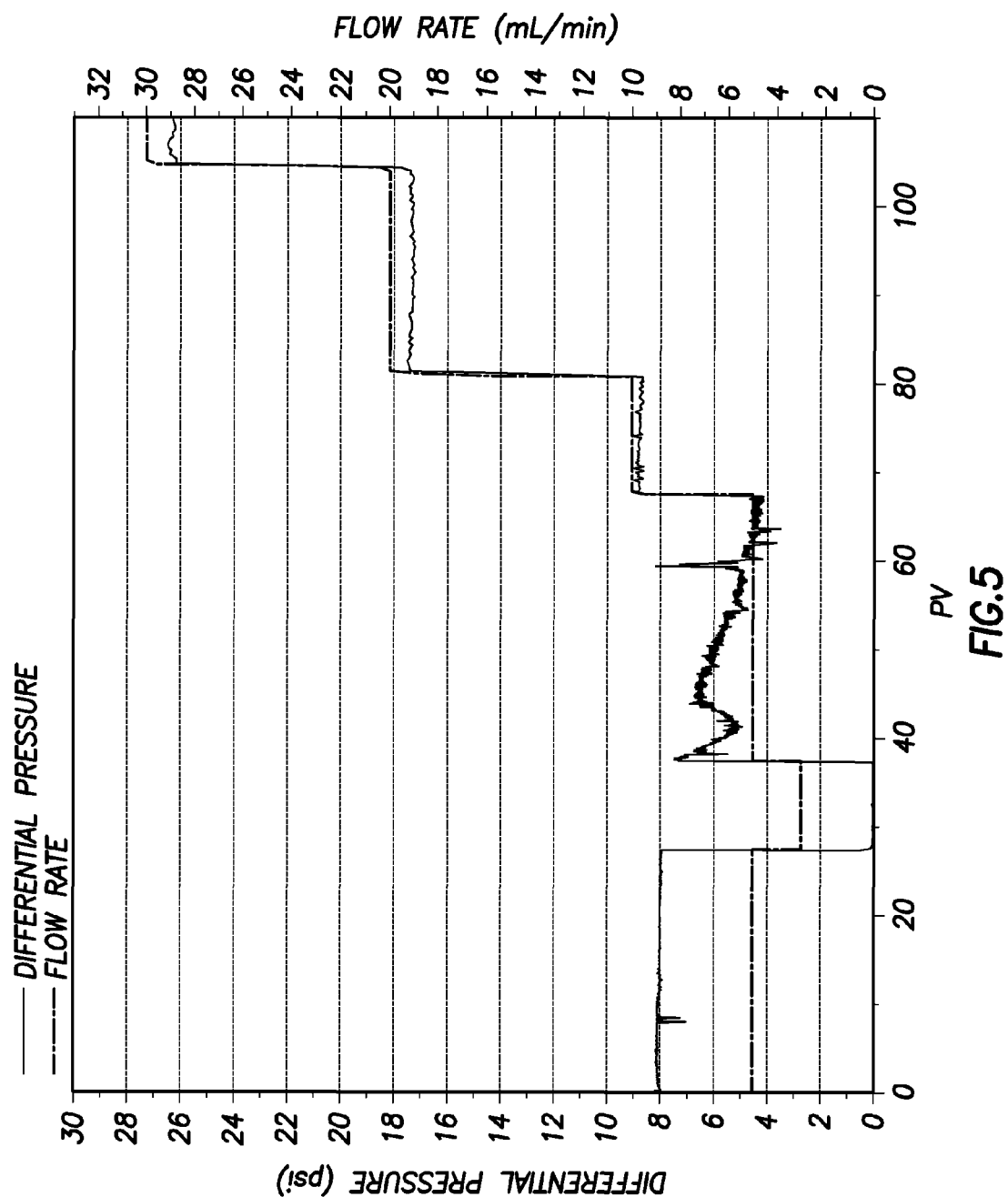
FIG. 5 shows an illustrative plot of differential pressure obtained when treating a native core sample at 250° F. with an acidizing fluid containing bis-quaternary ammonium compounds.

FIG. 4 shows an illustrative fractional pore volume effluent analysis of a native core sample treated at 250° F. with an acidizing fluid containing bis-quaternary ammonium compounds. As shown in FIG. 4, the silicon concentration remained relatively steady following acidization at approximately 900 mg/L, whereas the other dissolved species tended to trend with one another, which may be indicative of congruent dissolution. FIG. 5 shows an illustrative plot of differential pressure obtained when treating a native core sample at 250° F. with an acidizing fluid containing bis-quaternary ammonium compounds. As shown in FIG. 5, a substantial pressure decrease of approximately 45% was observed after flushing the core sample with brine.

Examples 6-8

For Examples 6-8, a native core sample having a composition of 84% quartz, 7% sodium feldspar, 2% illite/muscovite, 5% chlorite, and 2% ankerite, as determined by X-ray powder diffraction, was used for flow testing. The same core was used for each flow test in this series. Between tests, the core sample was flushed with brine, dried in a vacuum oven, and re-saturated with brine thereafter. The pore volume of the core sample was 10 mL.

Figure 6:
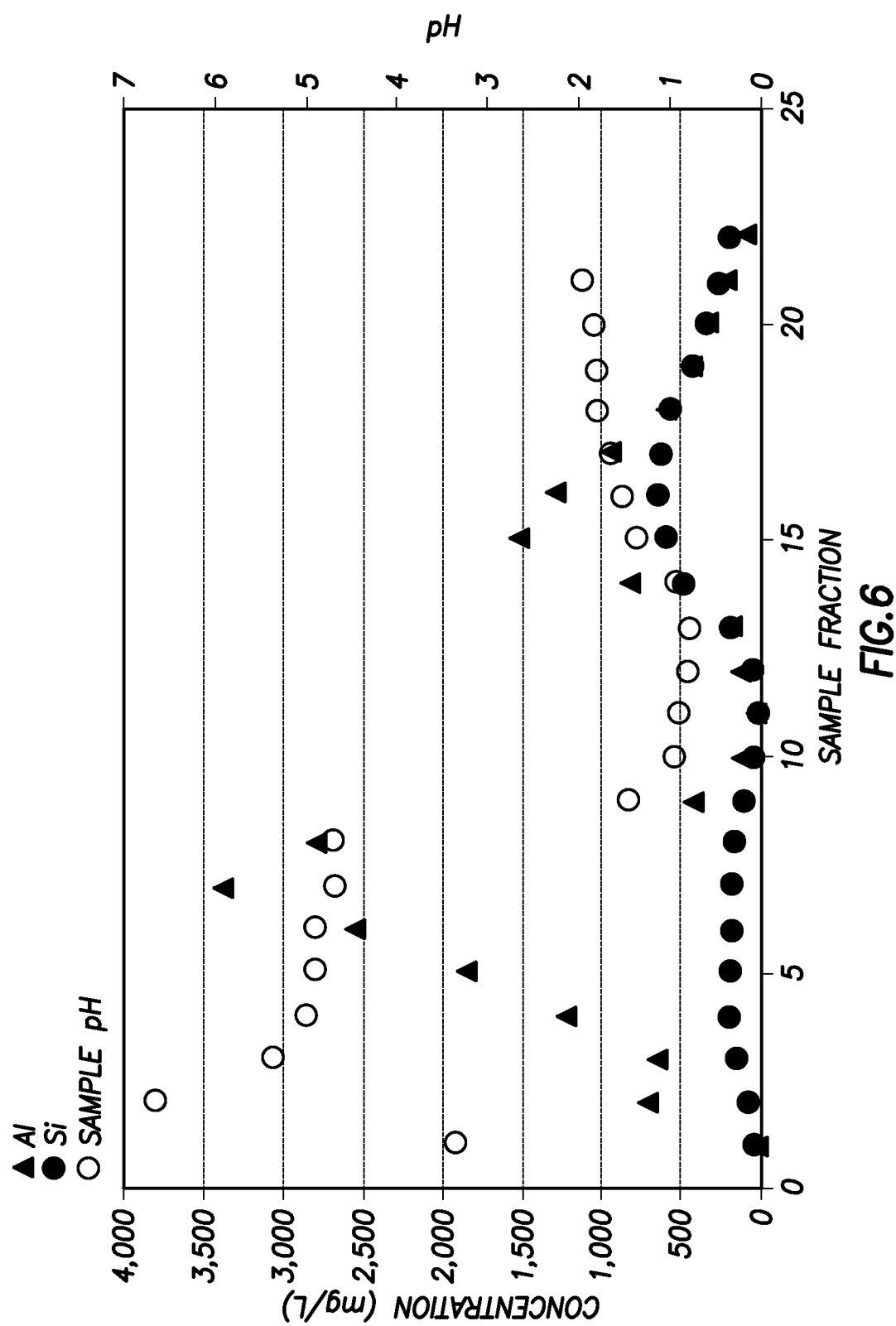
FIG. 6 shows an illustrative fractional pore volume effluent analysis of a native core sample treated at 285° F. with an acidizing fluid containing bis-quaternary ammonium compounds.

In Example 6, the core sample was treated at 285° F. with an acidizing fluid having a pH of 1.8 and containing 0.6 M TRILON M, 5 wt. % bis-quaternary ammonium compounds, and 2.4 wt. % HF. The pre- and post-flush fluid as 5% NH$_4$Cl. FIG. 6 shows an illustrative fractional pore volume effluent analysis of a native core sample treated at 285° F. with an acidizing fluid containing bis-quaternary ammonium compounds. As shown in FIG. 6, the silicon concentration was low when the pH was high, but the concentration reached approximately 500 mg/L at a pH of about 1. The high concentration of aluminum at higher pH values is consistent with stronger action of the chelating agent at these pH values.

Figure 7:
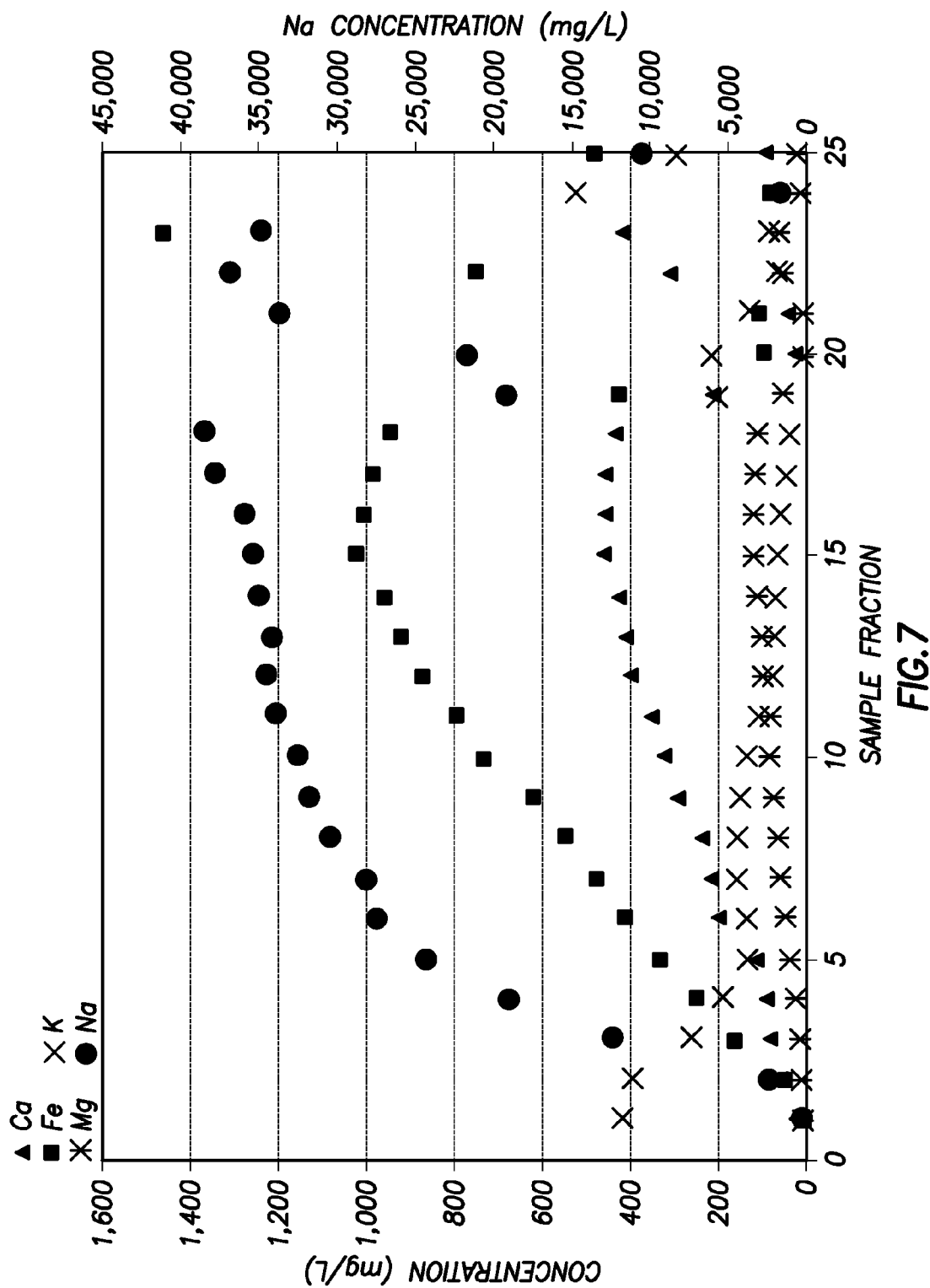
FIGS. 7 and 8 show illustrative fractional pore volume effluent analyses of a native core sample treated at 285° F. with an acidizing fluid containing bis-quaternary ammonium compounds.
Figure 8:
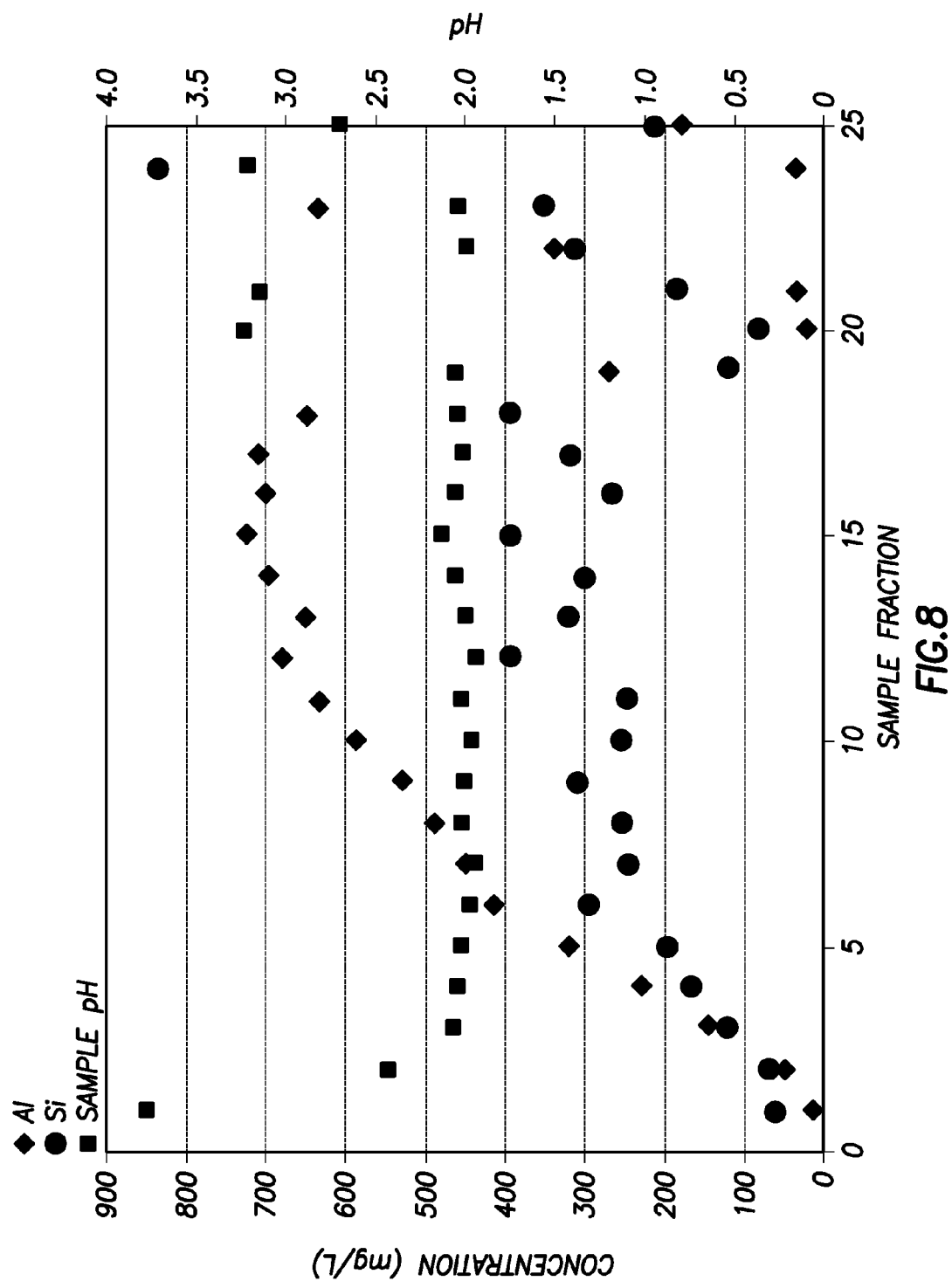

In Example 7, the core sample was treated at 285° F. with an acidizing fluid having a pH of 3.8 and containing 0.6 M TRILON M, 5 wt. % bis-quaternary ammonium compounds, and 3.2 wt. % ammonium bifluoride (2.2 wt. % HF). The core sample was treated with a series of forward and reverse fluid flushes as follows: 1.5 PV 3% KCl (reverse, 3 mL/min), 2 PV acidizing fluid (forward, 3 mL/min), and 3 PV 3% KCl (reverse, 3 mL/min). FIGS. 7 and 8 show illustrative fractional pore volume effluent analyses of a native core sample treated at 285° F. with an acidizing fluid containing bis-quaternary ammonium compounds. FIG. 8 presents the aluminum and silicon data of the experiment in relation to pH. As shown in FIG. 7, most of the soluble species trended upward during the treatment. Beginning at sample fraction 20, discontinuities were observed due to mixing with the brine. As shown in FIG. 8, the aluminum concentration continued to increase, even as the pH fell to approximately 2, where the chelation effect of the chelating agent is not as strong. The silicon concentration, in contrast, remained fixed at 250-400 mg/L, even after the pH settled at approximately 2.

Figure 9:
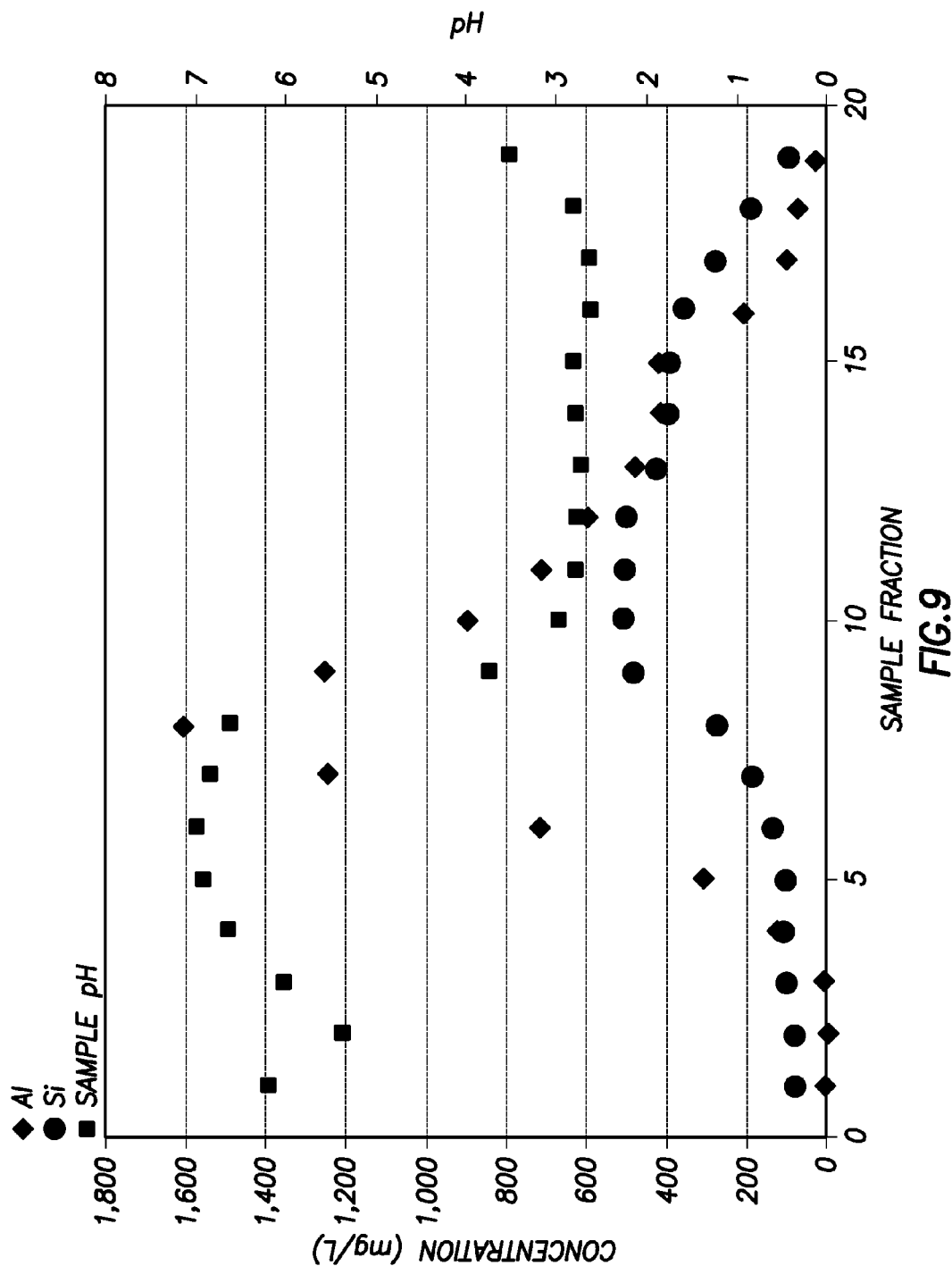
FIG. 9 shows an illustrative fractional pore volume effluent analysis of a native core sample treated at 270° F. with an acidizing fluid containing tetramethylammonium chloride.

In Example 8, the core sample was treated at 270° F. with an acidizing fluid having a pH of 4 and containing 0.6 M TRILON M, 10 wt. % tetramethylammonium chloride, and 0.5 wt. % HF. The pre- and post-flush fluid was 3% KCl. FIG. 9 shows an illustrative fractional pore volume effluent analysis of a native core sample treated at 270° F. with an acidizing fluid containing tetramethylammonium chloride. As shown in FIG. 9, at high pH values (above approximately 6), the quantity of dissolved aluminum was high. However, dissolved aluminum was much lower below a pH of approximately 4, particularly below a pH of approximately 3.

Example 9

Figure 10:
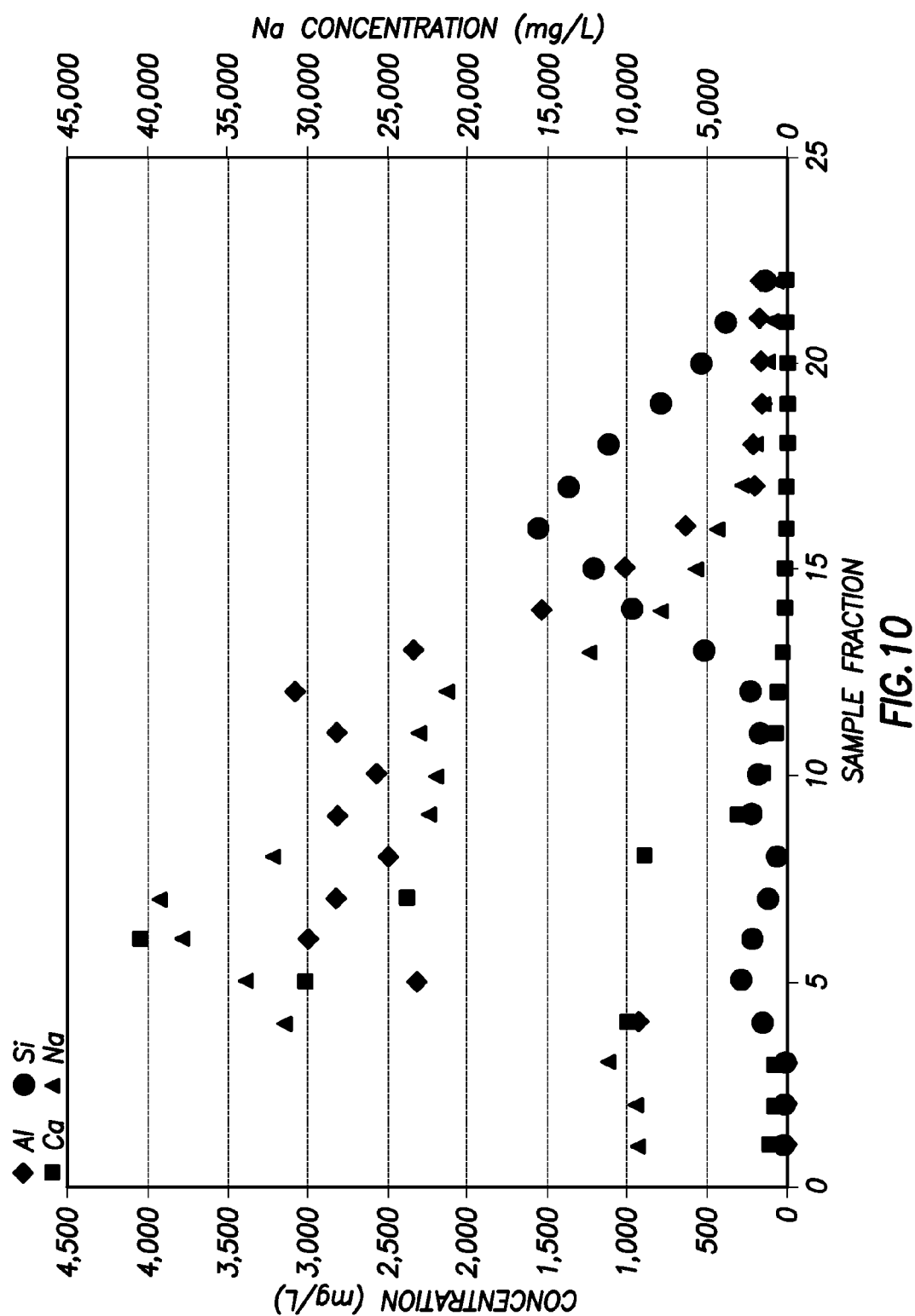
FIG. 10 shows an illustrative fractional pore volume effluent analysis of a bentonite/sand synthetic core treated at 280° F. with an acidizing fluid containing bis-quaternary ammonium compounds.

A synthetic core containing 5% bentonite and a mixture of 100 mesh sand was treated at 280° F. with one PV of an acidizing fluid having a pH of 2.8 and containing 0.6 M TRILON M, 5 wt. % bis-quaternary ammonium compounds, and 1.2 wt. % HF. The pore volume was 140 mL. The pack was flushed with 5% NH$_4$Cl. FIG. 10 shows an illustrative fractional pore volume effluent analysis of a bentonite/sand synthetic core treated at 280° F. with an acidizing fluid containing bis-quaternary ammonium compounds. As shown in FIG. 10, the silicon elution behavior was rather complex in this case.

Example 10

Figure 11:
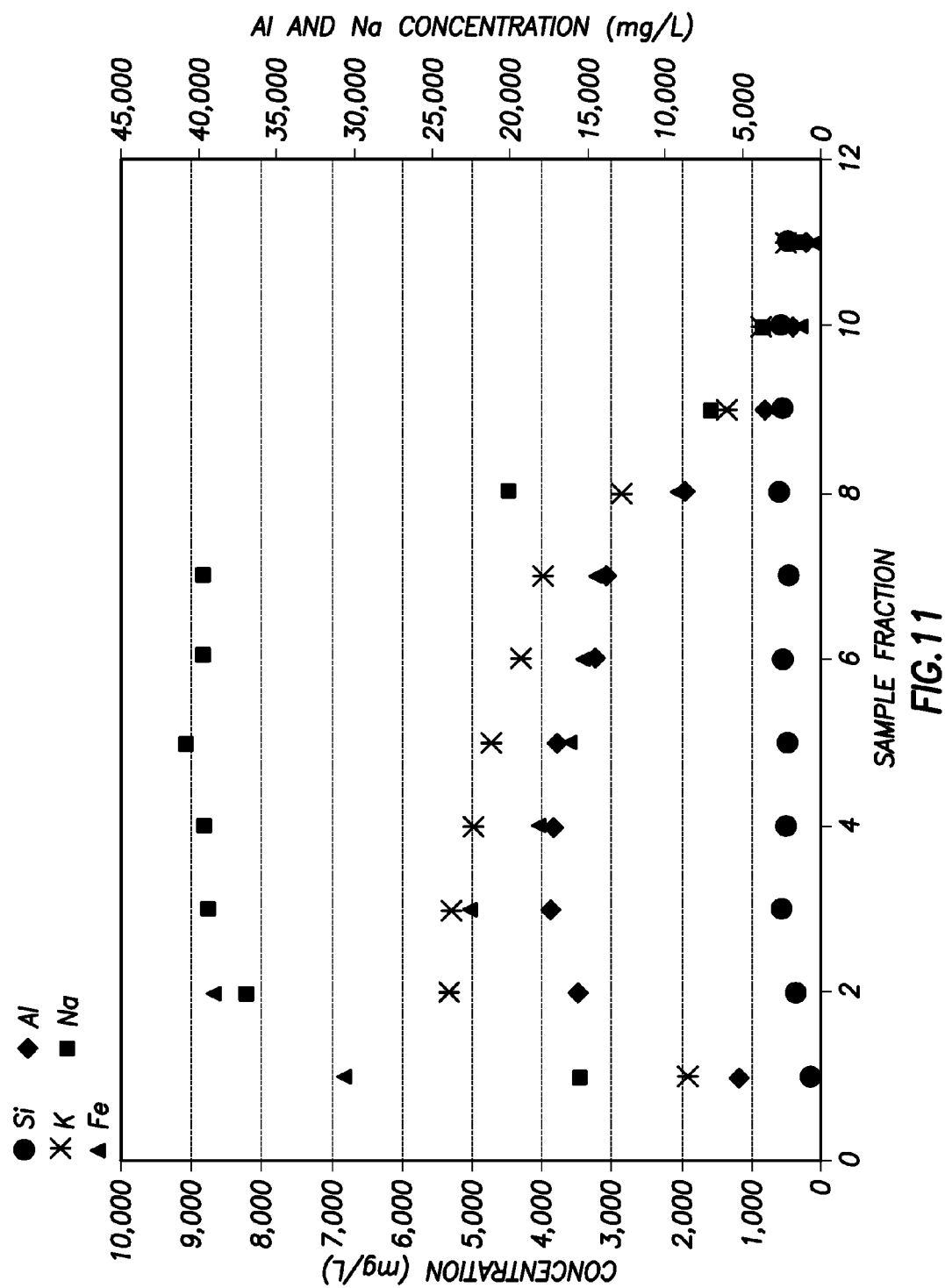
FIG. 11 shows an illustrative fractional pore volume effluent analysis of an illite/quartz synthetic core treated at 300° F. with an acidizing fluid containing bis-quaternary ammonium compounds, where pre- and post-flush with the bis-quaternary ammonium compounds was also conducted.

A synthetic core containing illite/quartz was treated at 300° F. with an acidizing fluid having a pH of 2.8 and containing 0.6 M TRILON M, 5 wt. % bis-quaternary ammonium compounds, and 2.2 wt. % HF. In this case, the pre- and post-flush fluids consisted of 2 wt. % bis-quaternary ammonium compound brines. FIG. 11 shows an illustrative fractional pore volume effluent analysis of an illite/quartz synthetic core treated at 300° F. with an acidizing fluid containing bis-quaternary ammonium compounds, where pre- and post-flush with the bis-quaternary ammonium compounds was also conducted.

It should be noted that the particular shape of the effluent analysis curves presented in the FIGURES may depend upon a number of factors, notwithstanding compositional variation of the fluid used for acidizing. For example, the number of pore volumes of acidizing and post-flush fluids utilized, as well as whether elution was conducted in the forward or reverse direction, may affect the elution profile. In addition, whether a synthetic core or a field core sample is being tested can significantly impact the elution profile. Thus, it is not possible to directly compare the elution profiles of the FIGURES to one another. Qualitatively, however, the high levels of aluminum and silicon in the FIGURES may demonstrate the beneficial effects of including bis-quaternary ammonium salts in acidizing fluids as compared to control experiments that follow below.

Example 11 (Control)

A Berea core (1"×3") was treated at 250° F. with an acidizing fluid (2% KCl brine) having a pH of 6.5 and containing 20 wt. % ammonium ethylenediaminetetraacetic acid (EDTA) and 1.5 wt. % HF. As shown in Table 3 below, only silicon eluted from the core sample under these conditions, and the aluminum concentrations remained very low. This behavior was in contrast to that observed when a bis-quaternary ammonium compound was present, when high levels of aluminum eluted from the core (see Example 2).

TABLE 3

| Fraction Number | Al (ppm) | Si (ppm) |
|---|---|---|
| 1 | 0.26 | 0.79 |
| 2 | 0.30 | 0.37 |
| 3 | 1.04 | 0.89 |
| 4 | 7.69 | 4.37 |
| 5 | 35.1 | 116 |
| 6 | 7.22 | 326 |
| 7 | 13.1 | 435 |
| 8 | 15.8 | 488 |
| 9 | 15.8 | 504 |
| 10 | 14.3 | 539 |
| 11 | 15.3 | 557 |
| 12 | 27.2 | 527 |
| 13 | 38.1 | 549 |
| 14 | 29.3 | 558 |
| 15 | 37.1 | 567 |
| 16 | 37.3 | 595 |
| 17 | 36.2 | 601 |
| 18 | 28.8 | 589 |
| 19 | 31.2 | 588 |
| 20 | 29.7 | 583 |
| 21 | 26.6 | 557 |
| 22 | 31.6 | 520 |
| 23 | 32.1 | 437 |

Example 12 (Control)

A synthetic core containing a kaolinite/quartz mixture (2"×10") was treated at 175° F. with an acidizing fluid (2% KCl brine) having a pH of 4.4 and containing 20 wt. % TRILON M and 0.5 wt. % HF. As shown in Table 4 below, only very low concentrations of aluminum and silicon eluted from the core sample under these conditions, even though the effluent pH ranged from 2-2.5. Again, this behavior differed considerably from that observed when a bis-quaternary ammonium compound was present.

TABLE 4

| Fraction Number | Al (ppm) | Si (ppm) |
|---|---|---|
| 3 | 0.15 | 53.5 |
| 6 | 2.41 | 49.3 |
| 9 | 1.39 | 51.9 |
| 12 | 6.45 | 37.6 |
| 15 | 0.31 | 51.3 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid that comprises:
a chelating agent;
a hydrofluoric acid source; and
a stabilizing compound having two or more quaternized amine groups;
introducing the treatment fluid into a subterranean formation; and
exposing the stabilizing compound to dissolved aluminum and silicon in the presence of alkali metal ions in the subterranean formation to mitigate precipitation by forming an ion pair,
wherein the stabilizing compound comprises a bis-quaternary ammonium compound;
wherein the bis-quaternary ammonium compound has a structure of

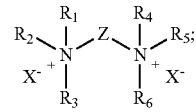

wherein $R_1$-$R_6$ each comprise a carbon-containing group comprising 1 to about 20 carbon atoms, $R_1$-$R_6$ being the same or different;
wherein Z comprises a linker moiety comprising two or more atoms;
wherein X is an anion;
wherein Z is selected from the group consisting of —CH($R_7$)$CH_2$—, —CH(O$R_7$)$CH_2$—, —CH(N$R_7R_8$)$CH_2$—, —CH($R_7$)$CH_2CH_2$—, —$CH_2$CH($R_7$)$CH_2$—, —CH(O$R_7$)$CH_2CH_2$—, —CH(N$R_7R_8$)$CH_2CH_2$—, —$CH_2$CH(O$R_7$)$CH_2$—, and —$CH_2$CH(N$R_7R_8$)$CH_2$—; and
wherein $R_7$ and $R_8$ are independently selected from the group consisting of H and a carbon-containing group comprising 1 to about 20 carbon atoms.

2. The method of claim 1, wherein the treatment fluid further comprises the alkali metal ions.

3. The method of claim 2, wherein the chelating agent comprises an alkali metal salt of the chelating agent, the treatment fluid further comprises a carrier fluid comprising an alkali metal salt, or any combination thereof.

4. The method of claim 1, wherein the chelating agent comprises an ammonium salt of the chelating agent, the treatment fluid further comprises a carrier fluid comprising an ammonium salt, or any combination thereof.

5. The method of claim 1, wherein the subterranean formation contains the alkali metal ions, the alkali metal ions not being removed from the subterranean formation before introducing the treatment fluid thereto.

6. The method of claim 1, wherein the subterranean formation contains an aluminosilicate material.

7. The method of claim 6, wherein the subterranean formation further contains about 1% to about 35% of a carbonate material.

8. A method comprising:
providing a treatment fluid comprising:
a chelating agent;
alkali metal ions;
a hydrofluoric acid source; and
a stabilizing compound having two or more quaternized amine groups;
introducing the treatment fluid into a subterranean formation;
at least partially dissolving a surface within the subterranean formation; and
exposing the stabilizing compound to dissolved aluminum and silicon in the presence of the alkali metal ions in the subterranean formation to mitigate precipitation by forming an ion pair,
wherein the stabilizing compound comprises a bis-quaternary ammonium compound;
wherein the bis-quaternary ammonium compound has a structure of

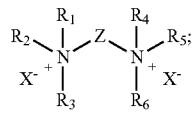

wherein $R_1$-$R_6$ each comprise a carbon-containing group comprising 1 to about 20 carbon atoms, $R_1$-$R_6$ being the same or different;

wherein Z comprises a linker moiety comprising two or more atoms;

wherein X is an anion;

wherein Z is selected from the group consisting of —CH($R_7$)CH$_2$—, —CH(O$R_7$)CH$_2$—, —CH(N$R_7R_8$)CH$_2$—, —CH($R_7$)CH$_2$CH$_2$—, —CH$_2$CH($R_7$)CH$_2$—, —CH(O$R_7$)CH$_2$CH$_2$—, —CH(N$R_7R_8$)CH$_2$CH$_2$—, —CH$_2$CH(O$R_7$)CH$_2$—, and —CH$_2$CH(N$R_7R_8$)CH$_2$—; and wherein $R_7$ and $R_8$ are independently selected from the group consisting of H and a carbon-containing group comprising 1 to about 20 carbon atoms.

9. The method of claim 8, wherein the chelating agent comprises an alkali metal salt of the chelating agent, the treatment fluid further comprises a carrier fluid comprising an alkali metal salt, or any combination thereof.

10. The method of claim 8, wherein the subterranean formation contains an aluminosilicate material.

11. A method comprising:
introducing a chelating agent, a stabilizing compound having two or more quaternized amine groups, and a hydrofluoric acid source into a subterranean formation;
at least partially dissolving a surface within the subterranean formation; and
exposing the stabilizing compound to dissolved aluminum and silicon in the presence of alkali metal ions in the subterranean formation to mitigate precipitation by forming an ion pair, wherein the stabilizing compound comprises a bis-quaternary ammonium compound;

wherein the bis-quaternary ammonium compound has a structure of

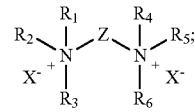

wherein $R_1$-$R_6$ each comprise a carbon-containing group comprising 1 to about 20 carbon atoms, $R_1$-$R_6$ being the same or different;

wherein Z comprises a linker moiety comprising two or more atoms;

wherein X is an anion;

wherein Z is selected from the group consisting of —CH($R_7$)CH$_2$—, —CH(O$R_7$)CH$_2$—, —CH(N$R_7R_8$)CH$_2$—, —CH($R_7$)CH$_2$CH$_2$—, —CH$_2$CH($R_7$)CH$_2$—, —CH(O$R_7$)CH$_2$CH$_2$—, —CH(N$R_7R_8$)CH$_2$CH$_2$—, —CH$_2$CH(O$R_7$)CH$_2$—, and —CH$_2$CH(N$R_7R_8$)CH$_2$—; and wherein $R_7$ and $R_8$ are independently selected from the group consisting of H and a carbon-containing group comprising 1 to about 20 carbon atoms.

12. The method of claim 11, wherein the chelating agent, the stabilizing compound, and the hydrofluoric acid source are combined in a treatment fluid that is introduced to the subterranean formation.

13. The method of claim 11, wherein the stabilizing compound is introduced to the subterranean formation before the chelating agent, the hydrofluoric acid source, or both.

14. The method of claim 11, wherein the subterranean formation contains an aluminosilicate material.

* * * * *